United States Patent
Todorov (10) Patent No.: US 9,185,107 B2
(45) Date of Patent: *Nov. 10, 2015

(54) SECURING PASSWORDS WITH HASH VALUE

(71) Applicant: Red Hat, Inc., Raleigh, NC (US)

(72) Inventor: Alexander Todorov, Sofia (BG)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/160,876

(22) Filed: Jan. 22, 2014

(65) Prior Publication Data

US 2014/0137224 A1    May 15, 2014

Related U.S. Application Data

(63) Continuation of application No. 12/788,756, filed on May 27, 2010, now Pat. No. 8,640,212.

(51) Int. Cl.
  *G06F 21/00* (2013.01)
  *H04L 29/06* (2006.01)
  *G06F 21/36* (2013.01)
  *H04L 9/32* (2006.01)

(52) U.S. Cl.
  CPC .............. *H04L 63/083* (2013.01); *G06F 21/36* (2013.01); *H04L 9/3271* (2013.01)

(58) Field of Classification Search
  CPC . H04L 9/0863; H04L 63/0435; H04L 63/083; H04L 63/06; H04L 2463/041; H04L 9/3271; G06F 21/36
  USPC ........................ 726/5, 7, 51; 709/229; 705/40
  See application file for complete search history.

(56) References Cited

U.S. PATENT DOCUMENTS

| | | | |
|---|---|---|---|
| 5,666,415 A * | 9/1997 | Kaufman | 713/159 |
| 6,195,695 B1 * | 2/2001 | Cheston et al. | 709/221 |
| 6,195,698 B1 * | 2/2001 | Lillibridge | G06F 21/31 709/203 |
| 7,024,695 B1 | 4/2006 | Kumar et al. | |
| 7,373,517 B1 * | 5/2008 | Riggins | 713/184 |
| 7,921,110 B1 * | 4/2011 | Ting et al. | 707/736 |

(Continued)

OTHER PUBLICATIONS

Erguler, I., A Password-based Key Establishment Protocol with Symmetric Key Cryptography, Networking and Communications, 2008. WIMOB '08. IEEE International Conference on Wireless and Mobile Computing,Date of Conference: Oct. 12-14, 2008,pp. 543-548.*
Wong, et al, A dynamic user authentication scheme for wireless sensor networks, IEEE, 2006,vol. 1, pp. 1-8.*
Pinkas et al, Securing passwords against dictionary attacks, CCS '02 Proceedings of the 9th ACM conference on Computer and communications security; 2002; pp. 161-170.*

(Continued)

*Primary Examiner* — Hadi Armouche
*Assistant Examiner* — Ali Shayanfar
(74) *Attorney, Agent, or Firm* — Lowenstein Sandler LLP (57) ABSTRACT

A password security system, hosted by a server, whose method of operation may include receiving a client hash value from a client where the client hash value is computed by hashing a password to generate a first hash value, and hashing the first hash value combined with a user input of an answer to a challenge to generate the client hash value. A server hash value is computed using password data for the user that is stored in a data store coupled to the server and a server-side answer that is stored in the data store. A determination is made whether the server hash value matches the client hash value and data access is granted to the user in view of a determination that the server hash value matches the client hash value, and data access is denied to the user in view of a determination that the server hash value does not match the client hash value.

11 Claims, 6 Drawing Sheets

(56) References Cited

U.S. PATENT DOCUMENTS

| | | | |
|---|---|---|---|
| 8,544,071 B1* | 9/2013 | Cato et al. | 726/6 |
| 2003/0163737 A1* | 8/2003 | Roskind | 713/201 |
| 2003/0226017 A1* | 12/2003 | Palekar et al. | 713/168 |
| 2007/0073787 A1* | 3/2007 | Tysowski et al. | 707/201 |
| 2007/0204330 A1 | 8/2007 | Townsley et al. | |
| 2007/0250920 A1* | 10/2007 | Lindsay | 726/7 |
| 2008/0072295 A1 | 3/2008 | Borenstein et al. | |
| 2008/0129457 A1 | 6/2008 | Ritter et al. | |
| 2009/0094461 A1* | 4/2009 | Tamura | 713/181 |
| 2010/0174919 A1* | 7/2010 | Ito et al. | 713/192 |
| 2011/0131415 A1* | 6/2011 | Schneider | 713/171 |
| 2012/0005474 A1* | 1/2012 | Bourret et al. | 713/150 |
| 2012/0079573 A1* | 3/2012 | Sagawa et al. | 726/6 |
| 2013/0166762 A1* | 6/2013 | Jalan et al. | 709/228 |

OTHER PUBLICATIONS

Robert Biddle et al., "User Study, Analysis, and Usable Security of Passwords Based on Digital Objects," IEEE Transactions on Information Forensics and Security, Sep. 2011, pp. 970-976, vol. 6, No. 3.

No Author, "Challenge/Response Login," Drupal, Version 6.x-dev, Nov. 20, 2004, as downloaded Jun. 10, 2010 from http://drupal.org/node/13240, 13 pages.

Chun-Ming Leung, "Depress Phishing by CAPTCHA with OTP," Department of Information Engineering, The Chinese University of Hong Kong, 2009, 6 pages.

\* cited by examiner

SECURING PASSWORDS WITH HASH VALUE

RELATED APPLICATION

This application is a continuation of U.S. patent application Ser. No. 12/788,756, filed on May 27, 2010, which is hereby incorporated by referenced it its entirety.

TECHNICAL FIELD

Embodiments of the present invention relate to securing passwords. Specifically, the embodiments of the present invention relate to securing passwords with CAPTCHA based hash.

BACKGROUND

A user can use a client to access Internet data, which is hosted by a server, using a secure or an insecure network connection. For example, the user may wish to reserve an airline flight using the Internet and may access the web page of an airline to search for a flight and to purchase a ticket. The user may submit a user name and password via the web page to the server to login for access to the airline's data. A web page that uses the hypertext transfer protocol (HTTP) passes data to the server as plain text. The connection between the client and the server may be an insecure HTTP connection, meaning that there is a possibility that the user name and password can be intercepted by an attacker as it is passed to the server. On the other hand, a data provider may implement a secure HTTP connection, which is an encrypted connection between a client and the server. Typically, an encrypted HTTP connection is based on a form of certificate system. Encrypted HTTP connections, such as HTTPS connections, are well known in the art and are used for systems, such as online banking, etc. Encrypted HTTP connections, however, are more expensive to implement and can add additional operating costs. In addition, secure HTTP connections are still subject to a 'man in the middle' attack if not implemented and administered properly.

As an alternative to the high costs of implementing a secure HTTP connection, some web pages include Javascript on the client-side to perform a one-way hash function on a password. When a client performs a one-way hash function on a password, the client generates a hash value (also known as a 'hash'). A server can store a hash value for the password and can receive a hash value from a client. The server can authenticate the password if the hash values are the same. Although hashed passwords can be cryptographically strong, they are still susceptible to attacks. For example, short passwords or weak passwords can be subject to dictionary or brute force attacks. Moreover, even if the password cannot be reversed by an attacker, the attacker can easily eavesdrop on an insecure HTTP connection and intercept a hash value and impersonate a user by reusing the hash value to login to a server.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for securing passwords with CAPTCHA based hash. A password security system, hosted by a server, sends a web page over a network to a client. The web page includes a CAPTCHA challenge, a request for a CAPTCHA answer for the challenge, and a security script. The security script is to be executed by the client to generate a client hash value from password data and a CAPTCHA answer that is received from a user. The system receives the generated hash value from the client and computes a server hash value for password data for the user that is stored in a data store that is coupled to the server and a CAPTCHA answer that is stored in the data store. The system determines whether the server hash value matches the client hash value, and grants data access to the user when the values match and denies data access to the user when the values do not match.

Internet users may submit a password via a web page to access data on a server using an insecure HTTP connection. An attacker may easily eavesdrop on the insecure HTTP connection and intercept the password of the user and/or a hash value of the password. Embodiments of the present invention can provide an additional level of password security over an insecure HTTP connection by securing passwords with CAPTCHA based hash. Traditionally, CAPTCHA challenges have been used on the web to distinguish humans from computer bots and typically, the primary use of CAPTCHA challenges has been to prevent bots from sending SPAM or misusing a service. Embodiments of the present invention can secure passwords with CAPTCHA based hash to help a data provider avoid changes in the infrastructure for implementing secure HTTP connections and additional costs for implementing the secure HTTP connections.

Figure 1:
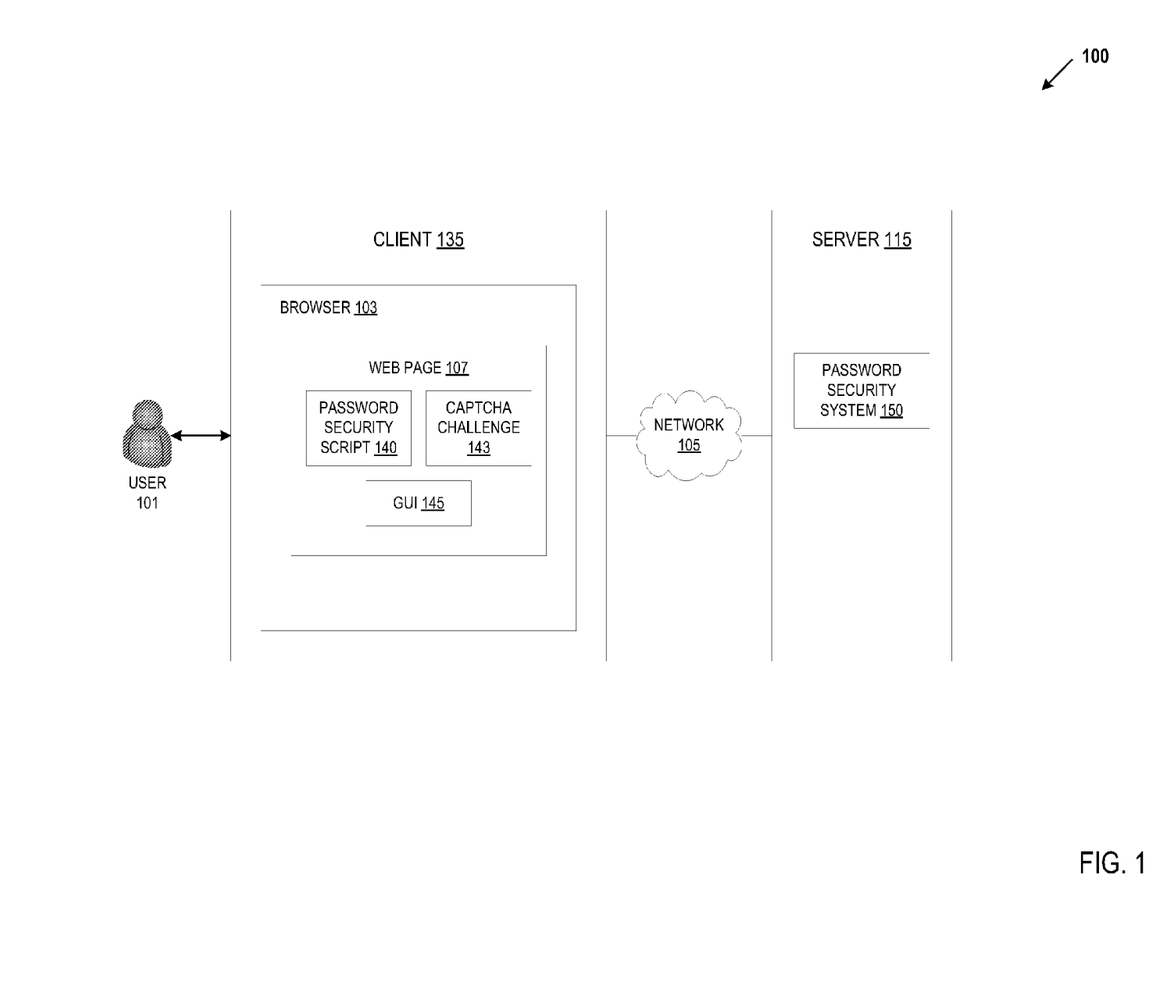
FIG. 1 illustrates an exemplary network architecture in which embodiments of the invention may operate.

FIG. 1 illustrates an exemplary network architecture 100 in which embodiments of the invention may operate. The architecture 100 includes a password security system 150 coupled to client 135 via a network 105. The client 135 can be a computing system such as a personal computer, a laptop, a PDA, a mobile phone, etc. The password security system 150 can be hosted by one or more servers 115 such as server computers, gateway computers, etc. The network 105 can be a public network (e.g., Internet) or a private network (e.g., a local area network (LAN)).

A user 101 can use a client 135 to access Internet data hosted by a server 115. For example, the user 101 may wish to reserve an airline flight using the Internet and may access the web page of an airline to search for a flight and to purchase a ticket. The user 101 may submit a user name and password via the web page to the server 115 to login for access to the airline's data.

A web page that uses the hypertext transfer protocol (HTTP) passes data, such as the user name and password, to the server 115 as plain text (also known as clear text). The connection between the client 135 and the server 115 can be an insecure HTTP connection, meaning that there is a possibility that the plain text user name and password can be intercepted by an attacker as it is passed to the server 115. A data provider, such as an on-line banking server provider, that hosts data on the server 115 can implement a secure HTTP connection, which is an encrypted connection between a client 135 and the server 115. Typically, an encrypted HTTP connection is based on a form of certificate system. Encrypted HTTP connections, such as HTTPS connections, are used for systems, such as online banking, etc. Encrypted HTTP connections, however, are more expensive to implement and can add additional operating costs. In addition, secure HTTP connections are still subject to a 'man in the middle' attack if not implemented and administered properly.

As an alternative to the high costs of implementing a secure HTTP connection, some web pages include Javascript on the client-side to perform a one-way hash function on a password, for example, using a Message-Digest algorithm 5 (MD5) hash function. When a client 135 performs a one-way hash function on a password, the client 135 generates a hash value (also known as a 'hash'). A hash is a value of specific length that is based on the content of the text passed to it. A server 115 can store a hash value of the password and can receive a hash value from a client 135. The server 115 can authenticate the password if the hash values are the same. A client 135, therefore, can send a clear text password to a server 115, or if a web page includes JavaScript for one-way hashing, the client 135 can send a hash value of a password to the server 115. An attacker, however, may easily eavesdrop on an insecure HTTP connection and intercept a clear text password and a hash value.

A server 115 can include a password security system 150 to add an additional level of security to a clear text password and/or a password hash that is being sent over insecure and/or secure HTTP connections. The password system 150 can generate a web page 107 that includes a CAPTCHA challenge 143 and a password security script 140 to add security to a plain text password and/or to a password hash based on the CAPTCHA challenge 143.

Figure 2:
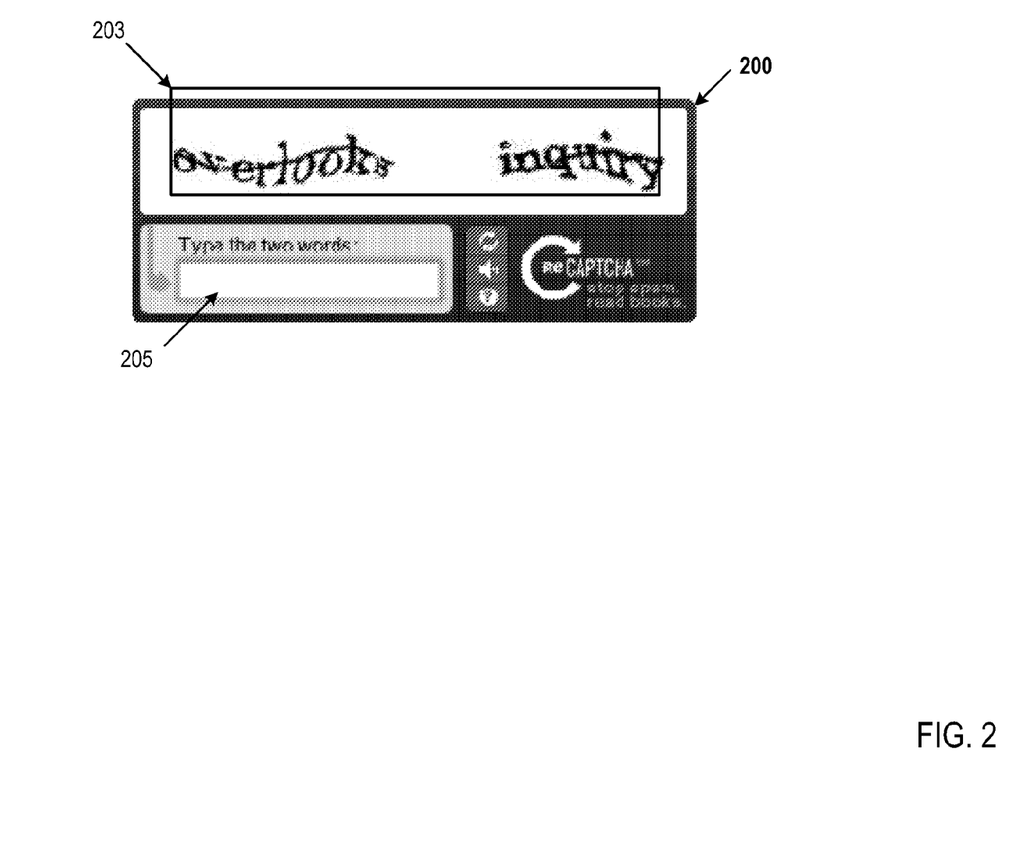
FIG. 2 illustrates an exemplary graphical user interface (GUI) and components of the GUI of a CAPTCHA challenge.

A CAPTCHA (Completely Automated Public Turing Test To Tell Computers and Humans Apart) challenge 143 is a type of challenge-response text used to ensure that a response, such as an answer to the challenge, is not generated by a computer. Traditionally, a CAPTCHA challenge 143 is used to help protect websites against 'bots' by generating and grading tests which a human can pass, but a current computer program cannot. A CAPTCHA challenge can be a graphical image, sound, etc. FIG. 2 illustrates one example of a CAPTCHA challenge 200. The CAPTCHA challenge 200 includes a graphical image 203 as a test and a graphical user interface 205 to receive user input of a CAPTCHA challenge answer to the test from a user. A CAPTCHA challenge is described in greater detail below in conjunction with FIG. 3 which describes one embodiment of the password security system 150.

Returning to FIG. 1, the password security system 150 can provide an additional level of password security over an insecure HTTP connection to help avoid changes in the infrastructure and the additional costs for implementing secure HTTP connections. It will be apparent, however, to one skilled in the art, that the present invention can be implemented over secure HTTP connections to provide an additional level of security. For example, a secure connection may be compromised, such as by a 'man in the middle' attack, and the password security system 150 can provide an additional level of defense.

The client 135 can receive the web page 107 from the server 115 using a general purpose browser 103 or a specialized application. The client 135 can execute the password security script 140 to add an additional level of security to a clear text password and/or a password hash before the client 135 sends it to the server 115. The execution of the password security script 140 is described in greater detail below in conjunction with FIG. 4 which describes one embodiment of a method for securing passwords with CAPTCHA based hash.

Figure 3:
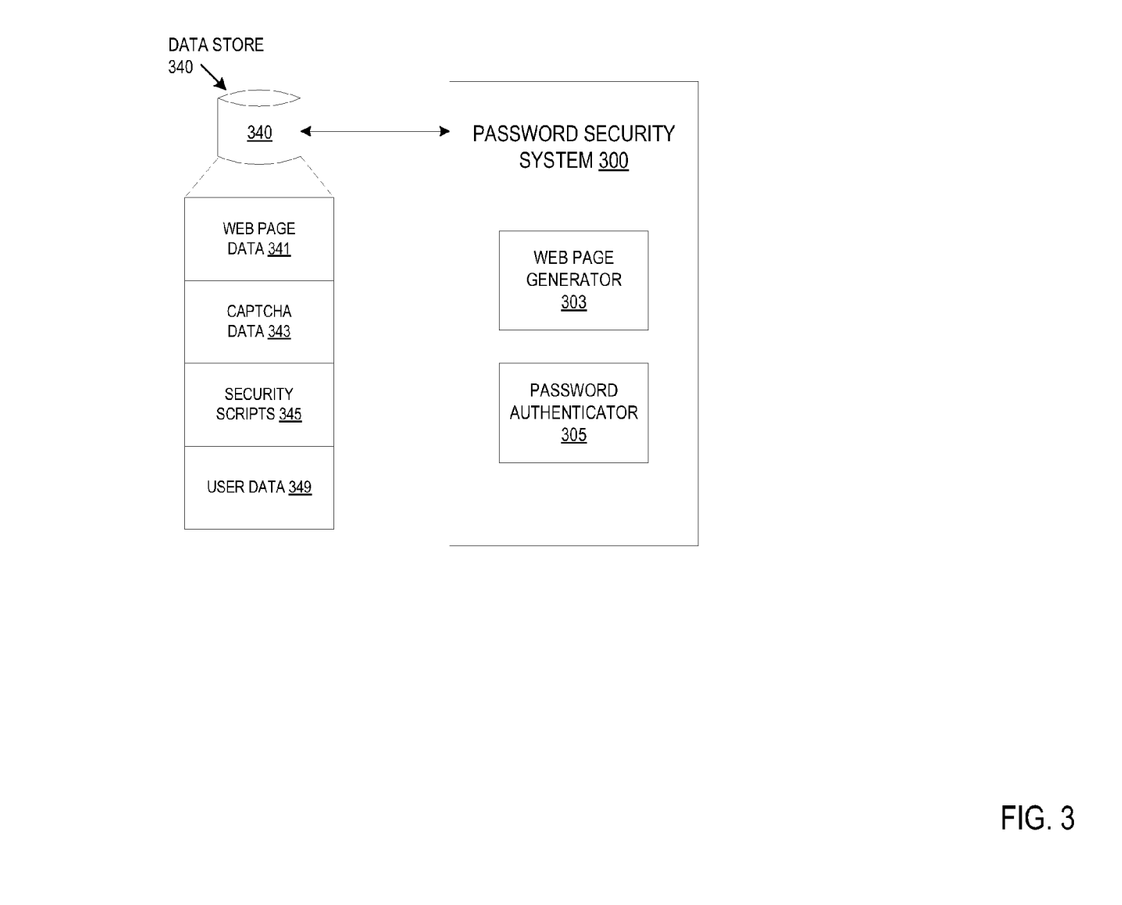
FIG. 3 is a block diagram of one embodiment of a password security system.

FIG. 3 is a block diagram of one embodiment of a password security system 300. The password security system 300 may be the same as the password security system 150 in the server 115 of FIG. 1. The password security system 300 includes a web page generator 303 and a password authenticator 305.

A user can use a client to request a web page from a server using a secure or an insecure HTTP connection. The client can send a request for the web page to the server. The web page generator 303 can receive the request from the client, can generate the web page, and can send the web page to the client. The web page generator 303 can create a web page that includes web page data 341, a CAPTCHA challenge, a request for a user name, a request for a user password, a request for a CAPTCHA challenge answer, and a security script 345 to be executed by the client.

The web page generator 303 can use web page data 341, CAPTCHA data 343, and one or more security scripts 345 stored on a data store 340 that is coupled to the password security system 300 to generate the web page. The data store 340 can be a persistent storage unit. A persistent storage unit can be a local storage unit or a remote storage unit. Persistent storage units can be a magnetic storage unit, optical storage unit, solid state storage unit, electronic storage unit (main memory) or similar storage unit. Persistent storage units can be a monolithic device or a distributed set of devices. A 'set', as used herein, refers to any positive whole number of items.

Web page data 341 can include the content for the web page, such as text, images, icons, web page extensions, etc. CAPTCHA data 343 can include unique CAPTCHA challenges and CAPTCHA answers for the challenges. The web page generator 303 can select a CAPTCHA challenge from the CAPTCHA data 343 to include in the web page. The web page generator 303 can store data, describing which CAPTCHA challenge is included in a particular web page and the corresponding CAPTCHA answer, as part of the CAPTCHA data 343.

A password security script 345 (security script) is a script which is to be executed by a client for adding security to a clear text password and/or a password hash which the client is to send to the server. When a client receives a web page from the server and presents the web page to a user, for example, via a browser, the user can enter a user name, a password, and an answer to a CAPTCHA challenge into the web page. Depending on whether or not the web page includes JavaScript for performing a one-way hash function on a clear text password received from a user, the client may or may not perform a one-way hash function on the password to generate hash value for the password. The client can execute the security script 345 to process the password (or the password hash) and the CAPTCHA answer to add additional security to the password (or the password hash). One embodiment of a method for processing the password or the password hash and the CAPTCHA answer for additional security is described in greater detail below in conjunction with FIG. 4.

The system 300 can store and maintain user data 349 in the data store 340. Examples of user data 349 can include authentication data for a user, such as the user name of a user, the clear text password of a user, the one-way hash function used for the user to generate a hash value for the password of the user, and a CAPTCHA challenge that is sent to a user and a corresponding CAPTCHA answer. The one-way hash function can be the same one-hash function to generate a hash value for the combination of the password with the CAPTCHA answer and/or a hash value for a combination of the password hash with the CAPTCHA answer. The system 300 can receive user data 349 for a user, such as the user name and the user password, when a user registers with the data provider, such as during an on-line banking registration process.

On the client-side, when the client receives the web page and user input of a user password from a user, the client can manage password data. Password data can includes the password received from the user or a hash value for the password if the client performs a one-way hash function on the password. For example, the client may receive a web page that does not include JavaScript for performing a one-way hash on a password. In such a case, the password data can include the clear text password that is received as user input from a user. When a client receives a web page that includes JavaScript for performing a one-way hash function on the password, the password data can include the hash value generated by the client from performing the one-way hash on the clear text password.

The client can add additional content to the password data before hashing the password data. The additional content can be known in the art as 'salt'. The client can receive a CAPTCHA answer from the user and combine it with the password data as salt. The client can execute the security script 345 to perform a one-way hash on the combination to generate a hash value for the combination. The client sends the hash value for the combination to the server. The client can also send the user name, the CAPTCHA answer, and additional user input received form a user, such as order form content, or other content, to the server.

The password authenticator 305 can receive the hash value for the combination of the password data and CAPTCHA answer from the client. The password authenticator 305 can search the user data 349 in the data store 340 for the plain text password for the user and/or the password hash for the user. The password authenticator 305 can search for the data based on the user name received from the client. The password authenticator 305 can search the data store 340 for the CAPTCHA answer stored in the CAPTCHA data 343 that corresponds to the CAPTCHA challenge which the server sent to the client. The password authenticator 305 can identify a one-hash function that is associated with the user and stored in the user data 349.

In one embodiment, the password authenticator 305 can compute two hash values. The password authenticator 305 can combine the CAPTCHA challenge answer that is stored in the data store 340 with the plain text password that is stored in the data store 340 and compute a first hash value for this particular combination. The password authenticator 305 can combine the CAPTCHA challenge answer that is stored in the data store 340 with the password hash that is stored in the data store 340 and compute a second hash value for this particular combination. The password authentication 305 can determine whether either of the computed hash values matches the hash value received from the client.

In another embodiment, the password authenticator 305 can compute a first hash value for combining either the password or the password hash that is stored in the data store 340 with the CAPTCHA challenge answer that is stored in the data store 340 and can determine whether this first hash value matches the hash value received from the client. If the first hash value does not match the hash value received from the client, the password authenticator 305 can compute a second hash value for combining either the password or the password hash with the CAPTCHA challenge answer that is stored in the data store 340.

The password authentication 305 can grant data access to the user when the values match and can deny data access to the user when the values do not match. The password authentication 305 can send a message to the client when the values do not match. An example of a message that is sent to the client is a message that indicates a user is not authenticated for access because a password may be invalid. In one embodiment, when the password authenticator 305 determines that the computed hash value matches the hash value received from the client, the password authenticator 305 can remove the CAPTCHA challenge and the CAPTCHA challenge answer associated with this particular login process from the data store 340 to prevent the CAPTCHA challenge and CAPTCHA answer from being used again.

Figure 4:
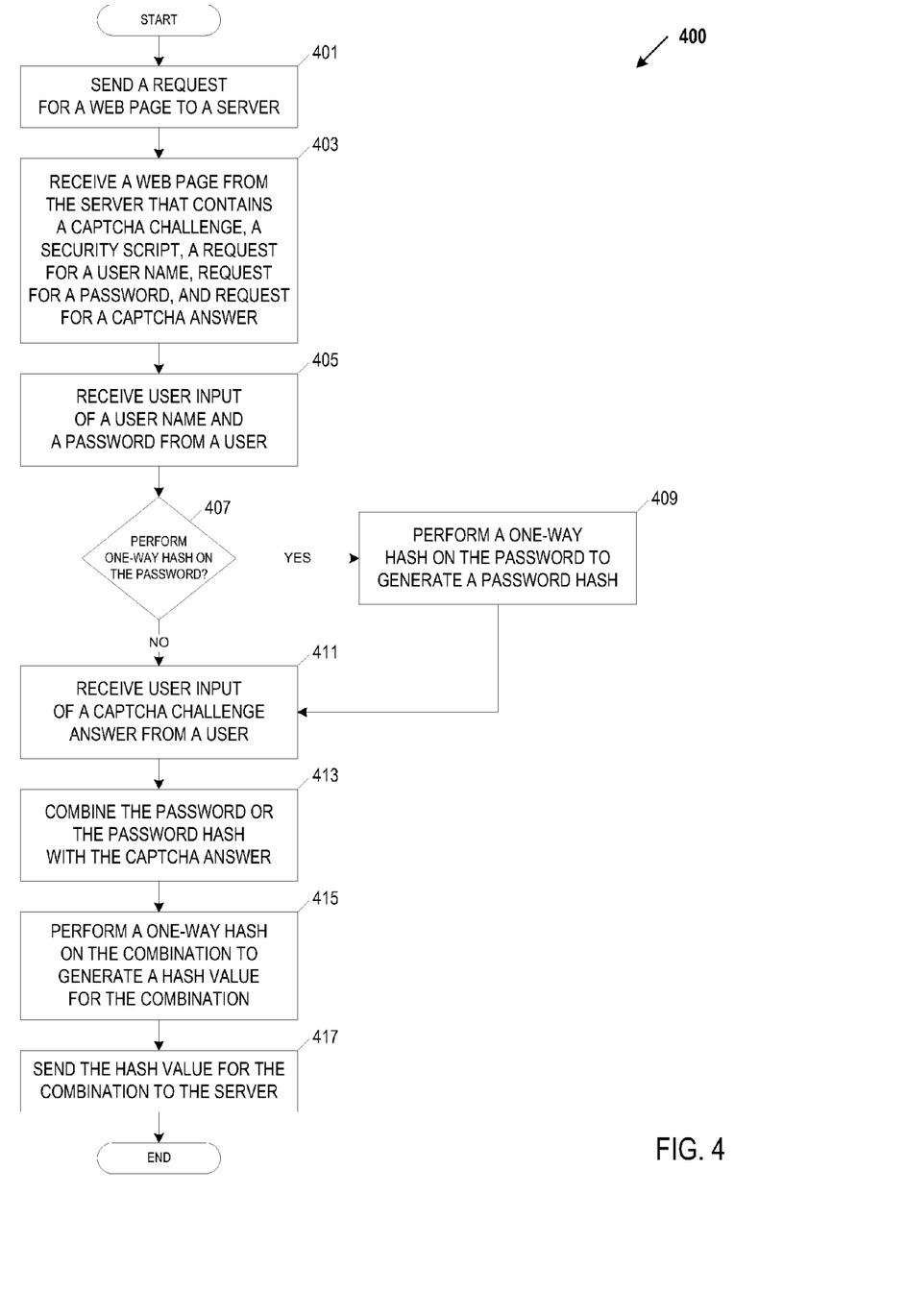
FIG. 4 is a flow diagram of one embodiment of a method for securing passwords with CAPTCHA based hash.

FIG. 4 is a flow diagram of one embodiment of a method 400 for securing passwords with CAPTCHA based hash. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the client system 135 of FIG. 1.

In one embodiment, the method 400 starts with the client requesting a web page from a server at block 401 and the client receives the web page from the server at block 403. The client and server can exchange web data over, for example, an insecure HTTP connection. The web page can be a graphical user interface that includes web page data, presents a CAPTCHA challenge (e.g., a CAPTCHA image, a CAPTCHA sound) to a user, and requests the user to provide a user name, a password, and a CAPTCHA challenge answer. The web page data can be an input form, such as a login form, comment form, order form, etc. The web page can include a security script to be executed by the client.

At block 405, the client receives user input of a user name and password. At block 407, the client determines whether to perform a one-way hash function on the password. If the client receives a web page that does not include JavaScript for performing a one-way hash on the password, the method continues to block 411. If the client receives a web page that includes JavaScript for performing a one-way hash on the password, the client computes a hash value for the password at block 409.

At block 411, the client receives user input of an answer to the CAPTCHA challenge. At block 413, the client executes the security script that is included in the web page to add additional content to the password, which was received at block 405, or the password hash, which was computed at block 409. This additional content can be known in the art as a 'salt'. The client uses the CAPTCHA answer received from the user as 'salt' to be added to the either the password or the password hash. The client combines either the password or the password hash with the CAPTCHA answer at block 413.

At block 415, the client performs a one-way hash on the combination of the password or the password hash with the CAPTCHA answer and generates a hash value for the combination. At block 417, the client sends the data to the server. The client can send the hash value for the combination and the user name received from the user. The client can also send additional user input, such as order form content, or other content, to the web server.

Figure 5:
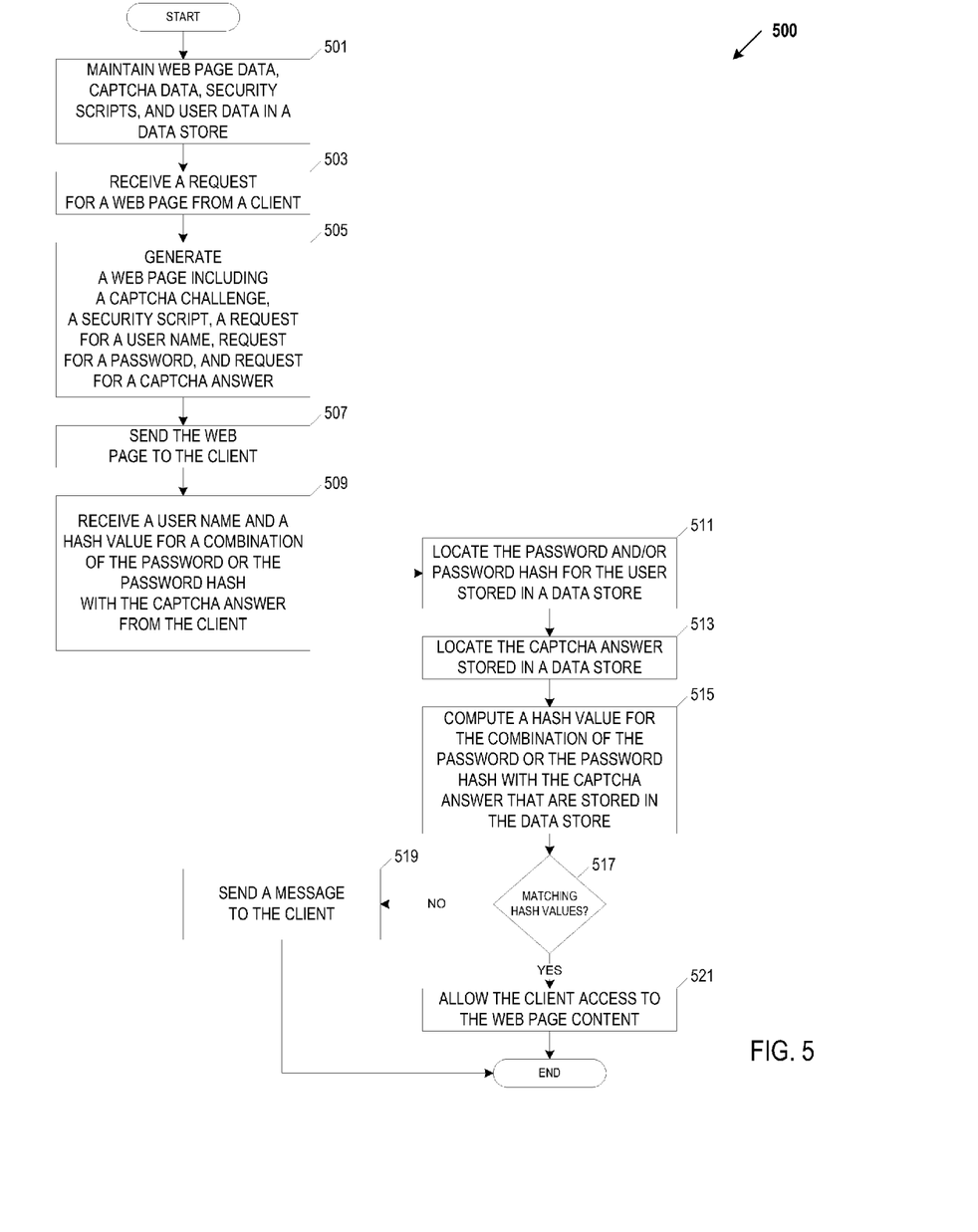
FIG. 5 is a flow diagram of one embodiment of a method for authenticating a password that is secured with CAPTCHA based hash.

FIG. 5 is a flow diagram of one embodiment of a method 500 for authenticating a password that is secured with CAPTCHA based hash. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the password security system 150 in a server 115 of FIG. 1.

In one embodiment, the method 500 starts with the password security system maintaining web page data, CAPTCHA data, one or more security scripts, and user data in a data store at block 501. At block 503, the password security system receives a request for a web page from a client. At block 505, the system uses the web page data, CAPTCHA data, and security scripts to generate the web page. The password security system selects a CAPTCHA challenge from the CAPTCHA data to include in the web page and stores data that describes which CAPTCHA challenge is selected and its corresponding CAPTCHA answer in the data store, for example, as part of the CAPTCHA data. The web page can be an input form, such as a login form, comment form, order form and can include a CAPTCHA challenge, and requests for a user name, a password, and a CAPTCHA challenge answer. The web page can include a security script to be executed by the client. At block 507, the system sends the web page to the client.

At block 509, the system receives a user name and a hash value for the combination of the password or the password hash with the CAPTCHA answer from the client. For example, the system receives a hash value that was computed by client by combining the password with the CAPTCHA answer and performing a one-way hash function on this particular combination of data. Alternatively, the system receives a hash value that was computed by the client by combining the password hash with the CAPTCHA answer and performing a one-way hash function on this particular combination of data.

At block 511, the system searches the data store for the password for the user and/or the password hash for the user. The system can search for the data based on the user name received from the client. At block 513, the system searches the data store for the CAPTCHA answer that corresponds to the CAPTCHA challenge which the server sent to the client. At block 515, the system identifies a one-hash function that is associated with the user from data stored in the user data. The system combines the CAPTCHA challenge answer with either the password or the password hash and performs the one-way hash function on the combination. The system can compute a hash value for a combination of the password with the CAPTCHA answer. Alternatively or in addition to, the system can compute a hash value for a combination of the password hash with the CAPTCHA answer.

At block 517, the system determines whether a computed hash value matches the hash value received from the client. The system can compare a hash value for a combination of the password with the CAPTCHA answer to the hash value received from the client. Alternatively or in addition to, the system can compare a hash value for a combination of the password hash with the CAPTCHA answer to the hash value received from the client. If none of the computed hash value matches the hash value received from the client (block 517), the system denies data access to the user at block 519. The system can send a message to the client, such as a message that indicates a user is not authenticated for access because a password is invalid.

If a computed hash value matches the hash value received from the client (block 517), the system grants access to the web page content to the user at block 521. In one embodiment, when the system determines that a computed hash value from block 515 matches the hash value received from the client at block 509, the system removes the CAPTCHA challenge and the CAPTCHA challenge answer that are associated with this particular login process from the data store to prevent the CAPTCHA challenge and CAPTCHA answer from being used again. The system can subsequently send a unique CAPTCHA challenge every time a web page is requested. Using the CAPTCHA answer as salt once or on very rare occasion, can force an attacker to require significant computing power to guess the salt when a client sends a password and/or hash values to the server, which can make an attack expensive. Thus, the use of a unique CAPTCHA answer as salt for a password or password hash can provide greater security for an end user because a password is less susceptible to brute force or dictionary attacks or such attacks are made more difficult.

Figure 6:
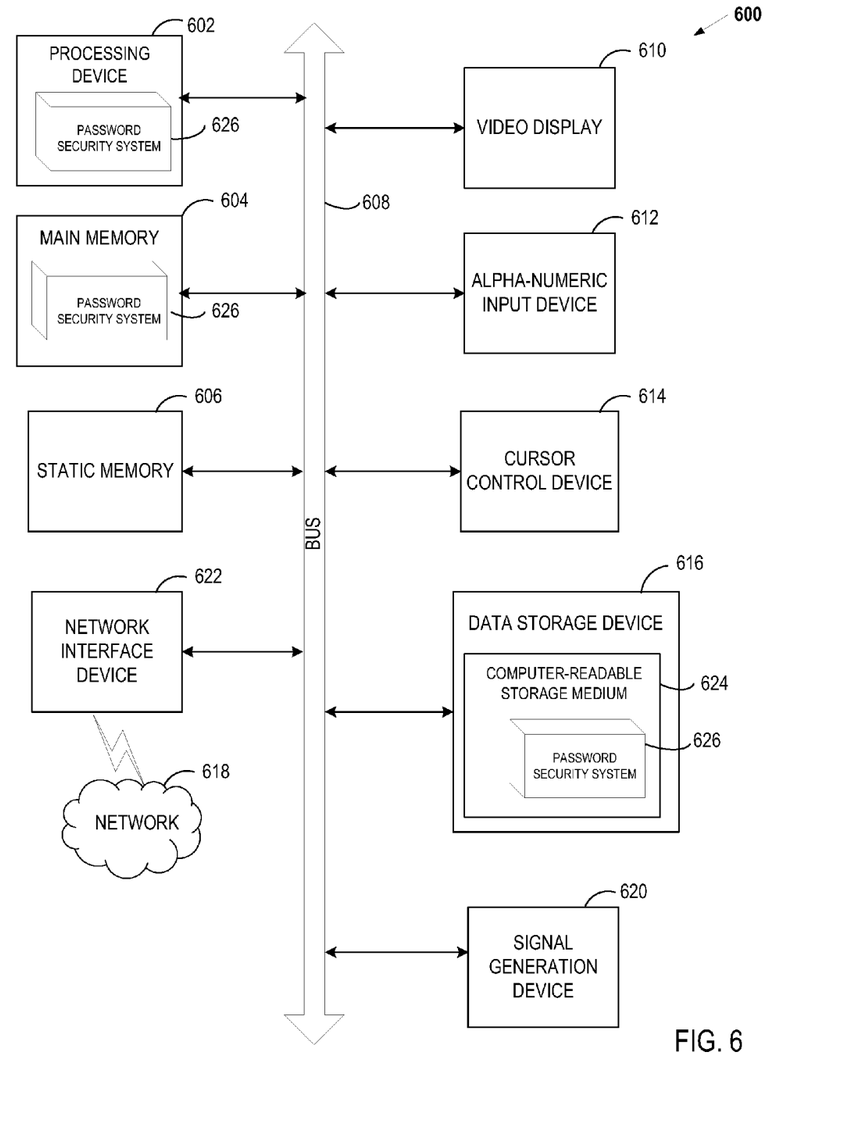
FIG. 6 is a diagram of one embodiment of a computer system for a password security system.

FIG. 6 is a diagram of one embodiment of a computer system for a password security system. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the password security system 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the password security system 626) embodying any one or more of the methodologies or functions described herein. The password security system 626 may also reside, completely or at least partially, within the main memory 604 and/or within the processing device 602 during execution thereof by the computer system 600, the main memory 604 and the processing device 602 also constituting machine-readable storage media. The password security system 626 may further be transmitted or received over a network 618 via the network interface device 622.

The computer-readable storage medium 624 may also be used to store the password security system 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The password security system 626, components and other features described herein (for example in relation to FIG. 1) can be implemented as discrete hardware components or integrated in the functionality of hardware components such as ASICS, FPGAs, DSPs or similar devices. In addition, the password security system 626 can be implemented as firmware or functional circuitry within hardware devices. Further, the password security system 626 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "sending," "receiving," "computing," "determining," "granting," "denying," "removing," "storing," "executing," "performing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for securing a password with CAPTCHA based hash has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of securing a password comprising:
receiving, by a processing device of a server computer system, a client hash value from a client, the client hash value computed by hashing the password to generate a first hash value, and hashing the first hash value combined with a user input of an answer to a challenge in response to a challenge presented to the user to generate the client hash value;

computing, by the processing device of the server computer system, a server hash value using password data for the user that is stored in a data store coupled to the server and a server-side answer that is stored in the data store;

determining, by the processing device of the server computer system, whether the server hash value matches the client hash value; and granting, by the processing device of the server computer system, data access to the user in view of a determination that the server hash value matches the client hash value and denying data access to the user in view of a determination that the server hash value does not match the client hash value.

2. The method of claim 1, further comprising sending to the client a first request for the password and a second request for user input of the answer to the challenge.

3. The method of claim 1, wherein the password data comprises a hash value for a password.

4. The method of claim 1, further comprising:
removing the server-side answer from the data store in view of a determination that the server hash value matches the client hash value.

5. A server computer system comprising:
a data store to store password data for a user and a server-side answer; and
a hardware processing device coupled to the data store, the hardware processing device to:
receive a client hash value from a client, the client hash value computed by hashing a password to generate a first hash value, and hashing the first hash value combined with a user input of an answer to a challenge in response to a challenge presented to the user to generate the client hash value;
compute a server hash value using the password data and the server-side answer;
determine whether the server hash value matches the client hash value; and
grant data access to the client in view of a determination that the server hash value matches the client hash value and denying data access to the client in view of a determination that the server hash value does not match the client hash value.

6. The system of claim 5, wherein the hardware processing device is further to send to the client a first request for the password and a second request for user input of the answer to the challenge.

7. The system of claim 5, wherein the password data comprises a hash value for a password.

8. The system of claim 5, wherein the processing device is further to remove the server side answer from the data store in view of a determination that the server hash value matches the client hash value.

9. A non-transitory computer-readable storage medium comprising instructions to secure a password that, when executed by a processing device, cause the processing device to:
receive, by the processing device, a client hash value from a client, the client hash value computed by hashing the password to generate a first hash value, and hashing the first hash value combined with a user input of an answer to a challenge in response to a challenge presented to the user to generate the client hash value;
compute, by the processing device, a server hash value using password data for the user that is stored in a data store coupled to the server and a server-side answer that is stored in the data store;
determine, by the processing device, whether the server hash value matches the client hash value; and
grant, by the processing device, data access to the user in view of a determination that the server hash value matches the client hash value and denying data access to the user in view of a determination that the server hash value does not match the client hash value.

10. The non-transitory computer-readable storage medium of claim 9, wherein the password data comprises a hash value for the password.

11. The non-transitory computer-readable storage medium of claim 9, wherein the processing device is further to send to the client a first request for the password and a second request for user input of the answer to the challenge.

* * * * *